US006474268B1

(12) United States Patent
Suchowski et al.

(10) Patent No.: US 6,474,268 B1
(45) Date of Patent: *Nov. 5, 2002

(54) COMPOSITE CHEW TOY

(75) Inventors: Bernard Suchowski, Marlboro, NJ (US); Simon Handelsman, Newburyport, MA (US)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,355

(22) Filed: Aug. 1, 2000

Related U.S. Application Data

(63) Continuation-in-part of application No. 09/122,228, filed on Jul. 24, 1998, now Pat. No. 6,116,191.

(51) Int. Cl.[7] .............................................. A01K 29/00
(52) U.S. Cl. ...................................... 119/709; 119/707
(58) Field of Search ................................ 119/709, 707, 119/710, 711, 706, 702; D30/160

(56) References Cited

U.S. PATENT DOCUMENTS

| | | | |
|---|---|---|---|
| 2,003,958 A | 6/1935 | Salisbury | 119/709 |
| 3,871,334 A | 3/1975 | Axelrod | 119/710 |
| 4,513,014 A | 4/1985 | Edwards | 426/132 |
| 4,674,444 A | 6/1987 | Axelrod | 119/710 |
| 4,771,733 A | 9/1988 | Axelrod | 119/710 |
| 4,802,444 A | 2/1989 | Markham et al. | 119/710 |
| 4,919,083 A | 4/1990 | Axelrod | 119/710 |
| 4,924,811 A | 5/1990 | Axelrod | 119/710 |
| 4,928,632 A | 5/1990 | Gordan | |
| D320,495 S | 10/1991 | Pallesen | D1/110 |
| 5,148,770 A | 9/1992 | O'Rourke | |
| 5,174,243 A | 12/1992 | O'Rourke | 119/709 |
| 5,200,212 A | 4/1993 | Axlerod | 426/2 |
| D337,398 S | 7/1993 | Axelrod | D30/160 |
| 5,263,436 A * | 11/1993 | Axelrod | 119/710 |
| D343,262 S | 1/1994 | Axelrod | D30/160 |
| 5,339,771 A | 8/1994 | Axelrod | 119/710 |
| D357,952 S | 5/1995 | Chen | D21/191 |
| D358,007 S | 5/1995 | Axelrod | D30/160 |
| 5,419,283 A | 5/1995 | Leo | 119/709 |
| 5,476,069 A | 12/1995 | Axelrod | 119/709 |
| 5,485,809 A | 1/1996 | Carroll | 119/710 |
| 5,595,142 A | 1/1997 | Chill | 119/710 |
| D384,985 S | 10/1997 | Cronic | D21/84 |
| 5,832,877 A | 11/1998 | Markham | 119/710 |
| 5,857,431 A | 1/1999 | Peterson | 119/710 |
| 5,912,285 A | 6/1999 | Godsey | 524/17 |
| 5,941,197 A | 8/1999 | Axelrod | 119/710 |
| 5,947,061 A | 9/1999 | Markham et al. | 119/710 |
| 6,067,941 A | 5/2000 | Axelrod | |
| 6,112,703 A * | 9/2000 | Handelsman | 119/707 |
| 6,116,191 A | 9/2000 | Suchchowski et al. | |
| 6,283,063 B1 * | 9/2001 | Zalevsky | 119/707 |
| 6,305,326 B1 * | 10/2001 | Suchowski et al. | 119/707 |

OTHER PUBLICATIONS

Catalog of Nylabone Products.
Sternco/Delta Products Catalog.

* cited by examiner

*Primary Examiner*—Charles T. Jordan
*Assistant Examiner*—Judith A. Nelson
(74) *Attorney, Agent, or Firm*—Stroock & Stroock & Lavan LLP

(57) ABSTRACT

A synthetic chew toy can be formed as a composite of two different materials. The toy can be formed with a rigid synthetic frame, supporting a softer chew portion. The chew portion can include a plurality of projections, preferably having a cylindrical shape with a hemispheric end, extending outward from a base of the chew portion. Thus, the rigidity of the frame provides structure, support and durability for the chew toy, and the relatively softer chew portion can provide beneficial effects to a pets teeth and gums, or provide greater chewing pleasure.

17 Claims, 7 Drawing Sheets

COMPOSITE CHEW TOY

CROSS-REFERENCE TO RELATED APPLICATIONS

This is a continuation-in-part of application Ser. No. 09/122,228, filed Jul. 24, 1998, now U.S. Pat. No. 6,116,191.

BACKGROUND OF THE INVENTION

The invention relates generally to chew toys for dogs and more particularly to a chew toy having a therapeutic effect on a dog's teeth and gums.

Various products exist in the market which are intended to clean a pet's teeth as the pet chews the product or to satisfy a pet's chewing urge. One type of product is an edible chew toy, made of materials such as rawhide, which is extremely hard and therefore unacceptable for certain older dogs or dogs with tooth problems. Other chew toys are formed of soft rubber materials and can exhibit unsatisfactorily high flexibility and/or unsatisfactory low durability. Other plastic products are molded from hard materials and can expose the inside of a dogs mouth to undesirably hard or sharp product. An example of a chew toy formed of a uniform synthetic material is disclosed in U.S. Pat. No. 5,263,436, the contents of which are incorporated herein by reference.

Accordingly, it is desirable to provide a synthetic chew toy for a pet, such as a dog, which overcomes shortcomings of existing chew toys.

SUMMARY OF THE INVENTION

Generally speaking, in accordance with the invention, a synthetic chew toy formed as a composite of two different materials is provided. The toy can be formed with a rigid synthetic frame, supporting a softer chew portion. The chew portion can include a plurality of projections, preferably having a cylindrical shape with a hemispheric end, extending outward from a base of the chew portion. Thus, the rigidity of the frame provides structure, support and durability for the chew toy, and the relatively softer chew portion can provide beneficial effects to a pet's teeth and gums, or provide greater chewing pleasure.

Accordingly, it is an object of the invention to provide an improved chew toy for pets, such as dogs.

Another object of the invention is to provide a chew toy for pets, having high durability.

Yet another object of the invention is to provide a chew toy for pets, having acceptable softness and flexibility.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
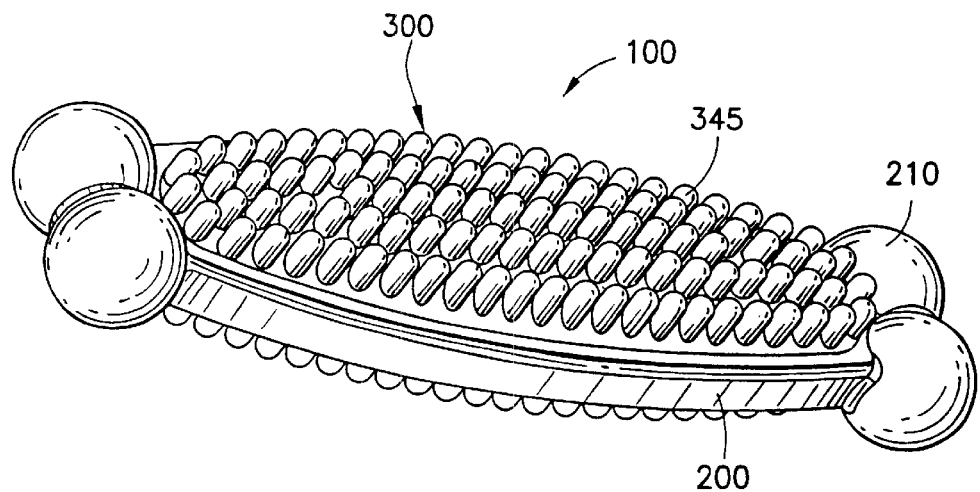
FIG. 1 is a perspective view of a chew toy constructed in accordance with a first embodiment of the invention.
Figure 2:
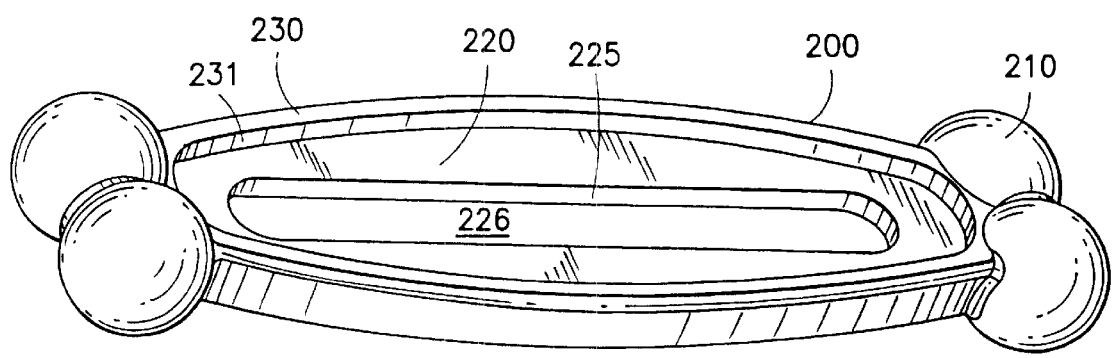
FIG. 2 is a perspective view of a frame portion of the chew toy of FIG. 1.

A chew toy constructed in accordance with a first embodiment of the invention is shown generally in FIGS. 1–4 as composite bone 100 and is formed with a frame 200 supporting a soft portion 300. Frame 200 includes four bulbous portions 210 at the ends thereof, to simulate a bone shape. Frame 200 also includes a support shelf 220 having an inner wall 225 defining an opening 226 in the shape of an elongated oval. Frame 200 also includes a support wall 230 surrounding and perpendicular to shelf 220, such that shelf 220 extends inward and perpendicular to an inner wall 231 of support wall 230.

Frame 200 is preferably highly rigid and provides composite bone 100 with its rigidity and durability. Frame 200 also provides composite bone 100 with a portion to simulate the hard portion of a natural bone. Frame 200 is preferably formed from a rigid, durable, non-toxic material, such as nylon, preferably 6-6 nylon. Frame portion 200 is advantageously molded to have a hardness in the range of 70 to 90, preferably 82–89, most preferably 85 Shore D hardness (Scale Shore D).

In the non-limiting embodiment exemplified by FIGS. 1–4, frame 200 is injection molded and then cooled to obtain maximum shrinkage. Thereafter, frame 200 is placed into the cavity of a second mold and the material for soft portion 300 is injection molded within the confines of the second mold and frame 200.

Figure 3:
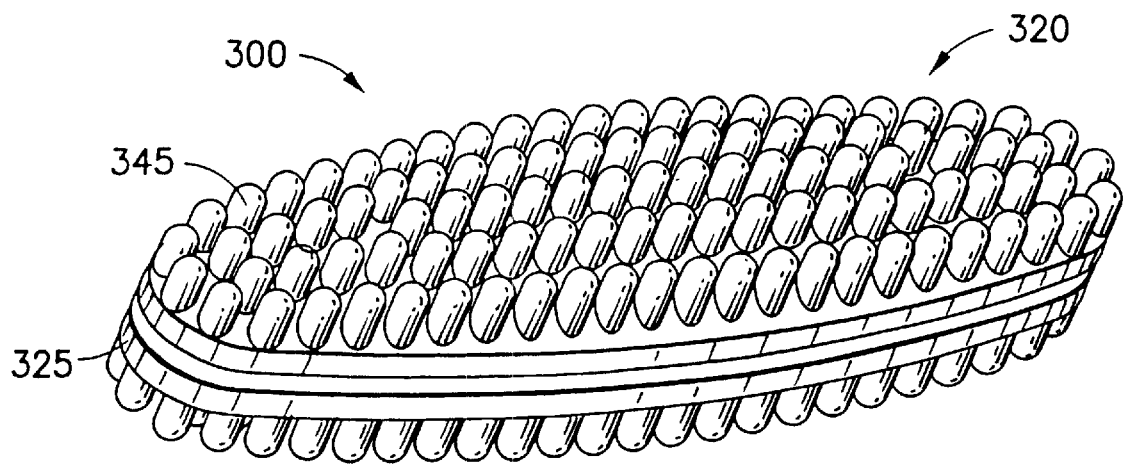
FIG. 3 is a perspective view of a soft portion of the chew toy of FIG. 1.
Figure 4:
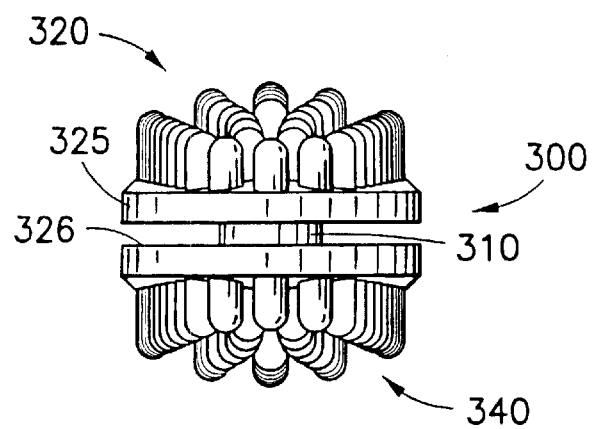
FIG. 4 is an end view of the soft portion of FIG. 3.
Figure 5:
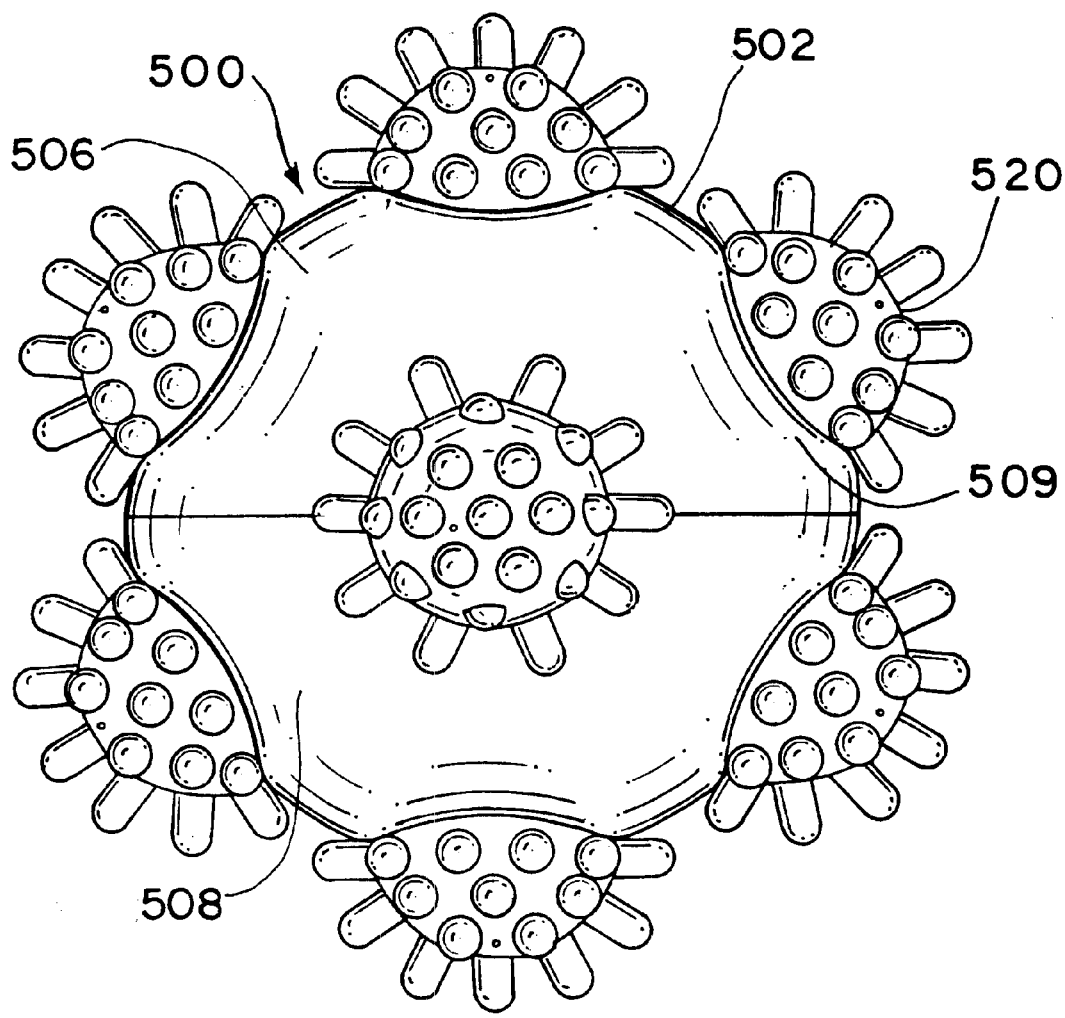
FIG. 5 is a plan view of a chew toy constructed in accordance with a second embodiment of the invention.

Soft portion 300 is formed of material which is considerably softer and more flexible than the material used to form frame 200. Referring to FIGS. 3 and 4, it can be seen that soft portion 300 includes a base 310 which fills the opening 226 defined by inner wall 225. Soft portion 300 also includes a pair of chew surfaces 320 having a pair of annular wings 325 having facing surfaces 326 which extend perpendicularly from base 310. Wings 325 fill the space defined by inner walls 231 and shelves 220 and extend perpendicular to and outward from walls 220 to form a pair of domes 340.

Each dome 340 supports a plurality of projections 345 which extend perpendicular to and in the opposite direction from facing surfaces 326. Projections 345 have a generally cylindrical shape and a hemispheric top, which presents a smooth contact surface for a dog's teeth and gums. The cylindrical shape can also enhance the ability of projections 345 to extend deep into spaces between a dog's teeth. It is believed that the combination of soft and hard portions and/or flexible projections, more closely simulate the plurality of textures encountered when chewing a natural bone containing bone, meat and gristle, and can stimulate chewing activity.

Although various resilient polymers can be used as the material to construct soft portion 300, a preferred material is polyurethane. Other natural and synthetic rubbers are also acceptable. Soft portion 300 should be molded to have a hardness in the range of 70 to 90, preferably 80–90, most preferably 85 Shore A hardness (Scale Shore A) as measured in a durameter.

Bone 100 can be formed of an assortment of additional materials, including ABS, PVC, polycarbonate and rubber. In preferred embodiments of the invention, scent and flavor additives such as cheese, beef, pork, chocolate and so on can be compounded with the material for forming frame 200 or soft portion 300 before they are molded. Preferably, the scent or flavor additive is compounded with material for forming soft portion 300.

With reference to FIGS. 5–10, there is shown a synthetic chew toy 500 in accordance with a second embodiment of the invention. In general, the chew toy 500 is provided with a substantially spherical frame 502 molded to have a plurality of apertures 504 (shown in FIG. 6) to receive a plurality of studs 520. The frame 502 is formed of a rigid, durable, non-toxic material as described above with reference to frame 200. The studs 520 are preferably formed from a second material which is considerably softer and more flexible than the material of the frame 502, as described above in reference to soft portion 300.

Figure 6:
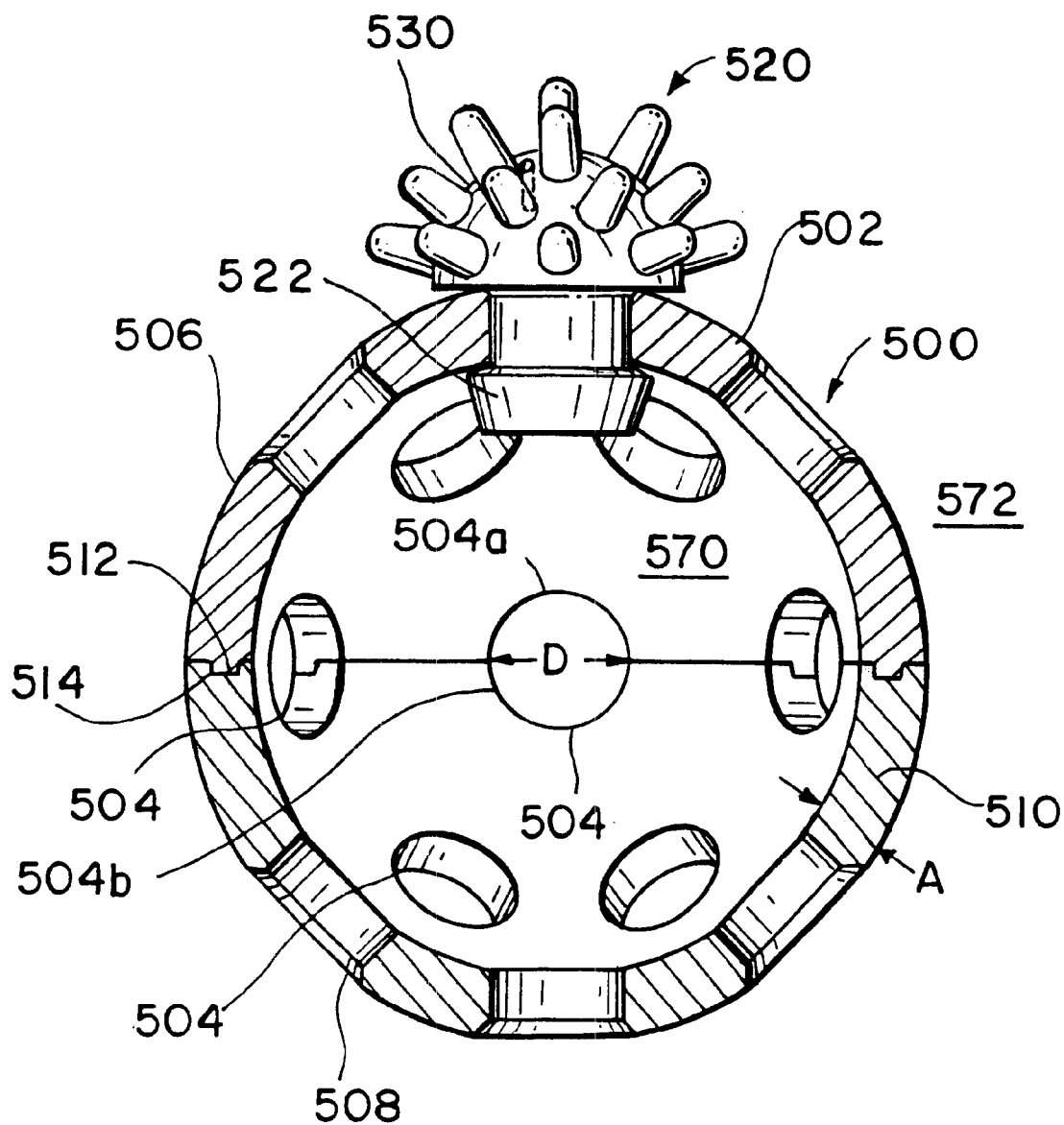
FIG. 6 is a cross-sectional view of the chew toy of FIG. 5.

The frame 502 is preferably injection molded in two halves 506, 508 which are then joined together. With further reference to FIG. 6, the male half 506 is preferably molded with a protrusion 512 and the female half 508 is molded with a groove 514. The protrusion 512 of the male half 506 is matingly engaged with the groove 514 of the female half 508. The protrusion 512 and groove 514 are preferably annular, each following the circumference of each of the respective halves 506, 508. Also, the protrusion 512 and the groove 514 could be either continuous, making a full, continuous path around the circumference of each of the respective halves 506, 508, or discontinuous, in the form of several protrusions 512 and corresponding grooves 514, as is shown in FIG. 6, where the protrusion 512 and groove 514 are discontinuous, being broken by the cutouts for the apertures 504 in the frame 502. The halves 506, 508 may be molded such that the apertures 504 are centered on the seam between the male half 506 and the female half 508, with a first portion 504a of an aperture being formed in the male half 506, and a second portion 504b being formed in the female half 508. The first portion of an aperture 504a, can be described as an aperture 504a on the male half 506, in which the aperture 504a is only partially encircled by the male half 506. Likewise, the second portion of an aperture 504b, can be described as an aperture 504b on the female half 508, in which the aperture 504b is only partially encircled by the female half 508. When the male half 506 and the female half 508 are joined, the first portion 504a and second portion 504b are aligned to form a single aperture 504 the is fully encircled by the frame 502. With the halves 506, 508 formed in this manner, the protrusion 512 and groove 514 are discontinuous, as discussed above.

The frame 502 is further preferably sealed by ultrasonically sealing the halves 506, 508, such that an integral frame 502 is formed, with the halves 506, 508 being fused into a single integral unit. Alternatively, other techniques known to those skilled in the art can be used to seal together the halves 506, 508.

Figure 10:
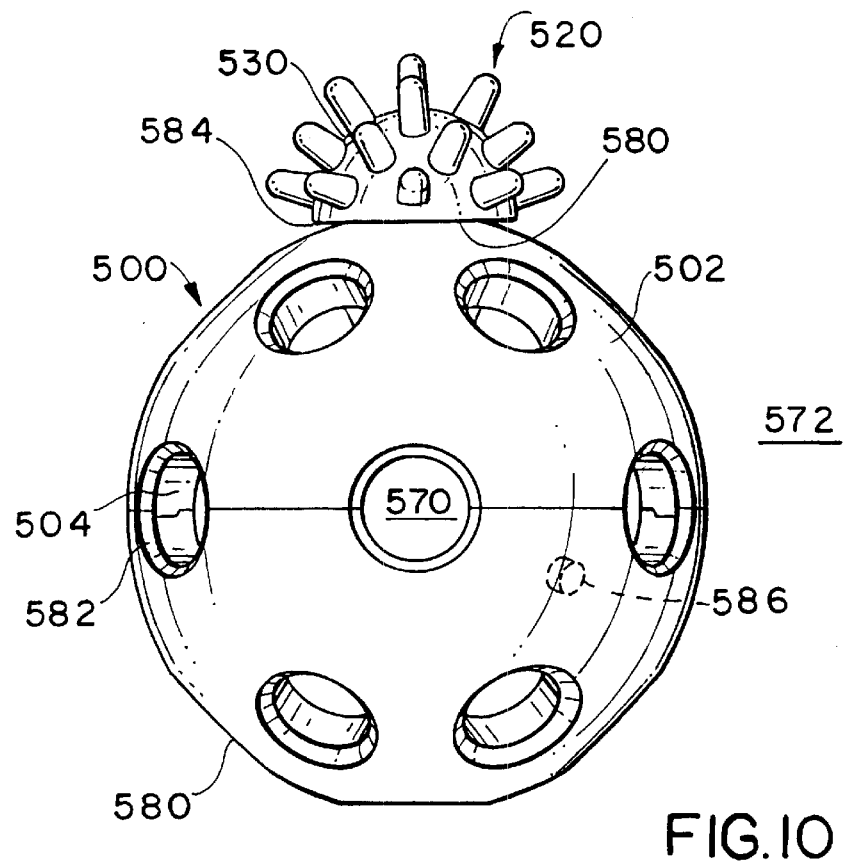
FIG. 10 is a plan view of an alternative embodiment of a frame of the chew toy of FIG. 5.

Turning to FIG. 10, the frame 502, having apertures 504, of the chew toy 500 is shown, with the frame 502 having a substantially spherical shape. Frame 502 need not be substantially spherical in shape, however, and could have one of a variety of shapes, such as, for example, an elongated football shape, or a substantially cylindrical or tubular shape. Further, in an alternate embodiment, while being substantially spherical, frame 502 has a plurality of flat portions 580, on the surface 509, encircling each of the apertures 504. Also, the apertures 504 may be formed with chamfered edges 582. The flat portions 580 and chamfered edges 582 facilitate stable retention of the studs 520, as will be discussed below.

Referring again to FIG. 6, there is shown a cross-section of a preferred embodiment of the present invention with the halves 506, 508 sealed together. As shown, the frame 502 is preferably hollow to permit the studs 520 to be anchored into place. Thus, the hollow frame 502 defines an interior volume 570, separated from ambient atmosphere 572. The frame wall 510 has a thickness A, which may depend upon the size of the ball, the type of studs, or the chewing power of the dog for which the toy is intended. Also, the halves 506, 508 need not be hollow, and may be formed as solid, non-hollow pieces. Apertures 504 could then be formed in the solid halves 506, 508, either before, or after the halves 506, 508 are joined together. Further, the frame need not be formed from two halves, but could be molded or formed from a single piece, or from three or more pieces.

The apertures 504 in the frame 502 may be formed during the molding or forming process of halves 506, 508. Alternatively, some or all of the apertures 504 may be formed in a second step by, for example, drilling or cutting the apertures in previously formed halves 506, 508. In a preferred embodiment, at least a part of an aperture 504 is molded on each half 506, 508, then, in a subsequent step, at least one aperture 504 is drilled in the frame.

Figure 7:
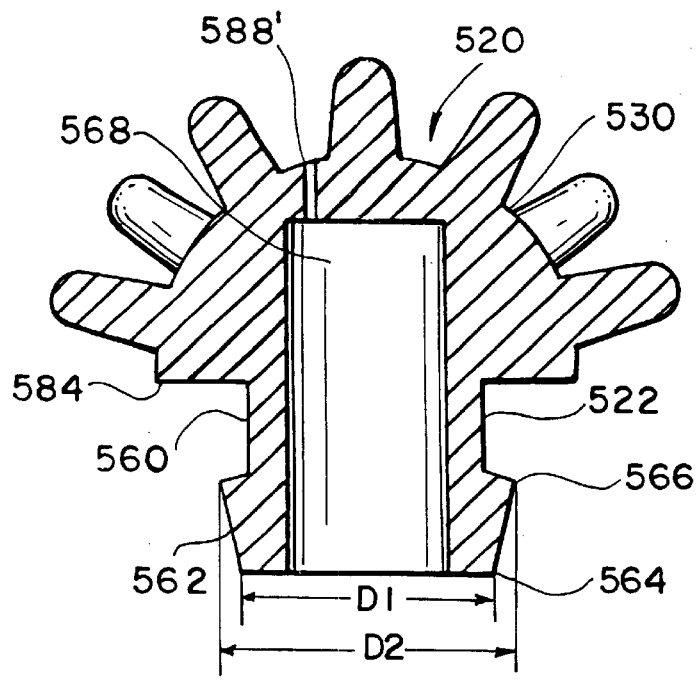
FIG. 7 is a cross-sectional view of a first embodiment of a stud for use with the chew toy of FIG. 5.

A first embodiment of a stud 520 for use with the present invention is shown in FIG. 6. The stud 520 is generally round when viewed from the top or bottom, although the particular shape of the stud 520 is not critical. Stud 520 has a securing member 522 and a chew portion 530. The securing member 522 is insertable into the aperture 504 of the frame 502 so as to secure the stud 520 to the frame 502. With further reference to FIG. 7, the securing member 522 generally includes a stem 560 and an anchor 562. Anchor 562 is tapered inwardly toward a first end 564 of stud 520. In a preferred embodiment, a first end 564 of anchor 562 has a first diameter D1 that is substantially the same or less than the diameter D (FIG. 6) of aperture 504 of frame 502. Furthermore, a second end 566 of anchor 562 must have a diameter D2 that is greater than the diameter D of aperture 504 of frame 502. As such, upon insertion of securing member 522 of stud 520 into aperture 504, as shown in FIG. 6, stud 520 will be anchored into frame 502 due to the larger diameter D2 of second end 566. As will be described below, the inward taper of anchor 562 facilitates insertion of stud 520 into aperture 504.

Referring again to FIG. 7, in a preferred embodiment, a substantially cylindrical hollow 568 is preferably formed through at least a portion of stud 520. Hollow 568 is preferably concentric with anchor 562. In use, hollow 568 facilitates the temporary inward deflection or deformation of anchor 562 so that stud 520 may be press fit into aperture 504. When stud 520 is inserted into aperture 504, the first end 564, and then the second end 566 of anchor 562, pass through aperture 504. The inward taper of anchor 562 and the hollow 568 facilitate the temporary deformation of anchor 562 during the insertion process. Since anchor 562 is formed of a resilient material, its deformation will only be temporary, and after the insertion process, the anchor 562 will return to its original, or substantially its original, shape.

Preferably, the stud 520 is unitarily formed of a single material. It should also be noted, however, that the chew portion 530, the securing member 522 and anchor 562 need not be formed of the same material, and may be formed of materials with differing hardness and resiliency characteristics.

Figure 8:
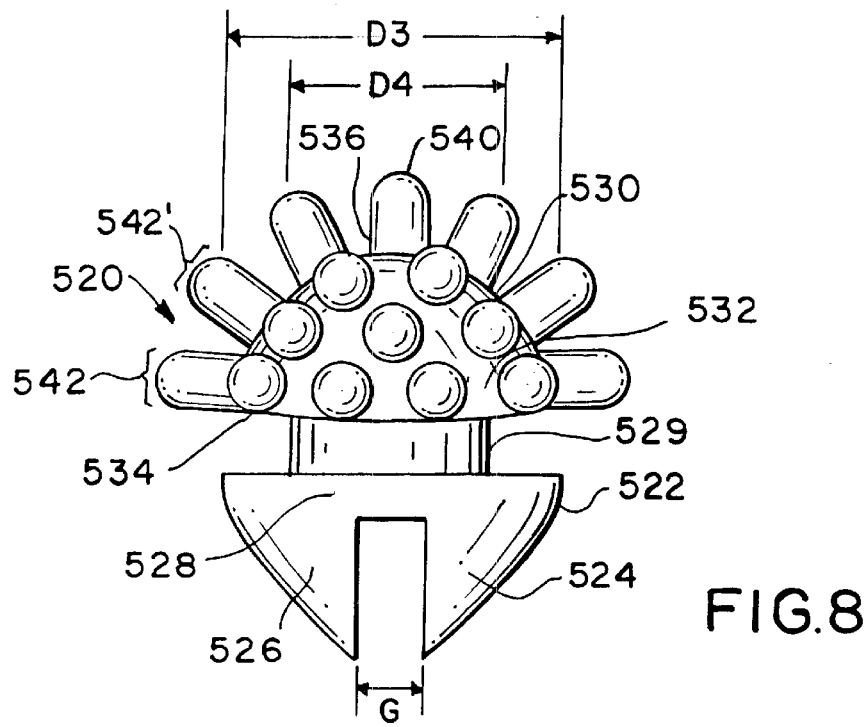
FIG. 8 is a plan view of a second embodiment of a stud for use with the chew toy of FIG. 5.

With reference now to FIG. 8, a second embodiment of a stud 520 for use with the chew toy 500 is shown. Securing member 522 has a pair of split arms 524, 526 which extend from a base 528 of the securing member 522. The arms 524, 526 are separated by a gap G to permit the arms 524, 526 to be inwardly deflectable. As the securing member 522 is inserted into the aperture 504 the arms 524, 526 deflect inward causing base 528 to bend inwardly. This inward deflection permits the stud 520 to be inserted into aperture 504. Since the securing member 522 and arms 524, 526 are formed of a resilient material, the inward deflection of the arms 524, 526 will only be temporary, and after the insertion process, the securing member 522 and arms 524, 526 will return to their original, or substantially their original, shape. Because the diameter D3 of base 528 is larger than the diameter D of the aperture 504, the inserted base 528 will anchor stud 520 into the frame 502.

Base 528 in turn is connected to stem 529. The diameter D3 of base 528 is preferable wider than the diameter D of the aperture 504 (as shown in FIG. 6), so as to prevent the stud 520 from being dislodged. The stem 529, which is narrower than the diameter D3 of base 528, has a diameter D4 that is preferably the same or slightly wider than diameter D of the aperture 504 so as to create a tight fit. Also, the diameter D4 of stem 529 could be less than diameter D of aperture 504. A tight fit is preferable, however, because it will limit the amount of movement in the stud 520.

Securing member 522 is connected to chew portion 530 which lies exposed in the ambient atmosphere 572 outside of frame 502. It is preferable that the securing member 522 and the chew portion 530 are integrally formed to increase the strength and resiliency of the studs 520.

As shown in FIG. 7, chew portion 530, formed on both embodiments of the stud 520, is preferably hemispherical with a plurality of projections 540 extending from the surface 532 of the chew portion 530. The projections 540 are preferably arranged concentrically in bands 542, 542' of decreasing diameters, which begin at a base 534 and end at an apex 536 of the chew portion 530. Alternatively, the projections 540 may be disposed in a different, more random configuration than the concentric band arrangement. Furthermore, chew portion 530 is preferably constructed to overlap a portion of the frame 502 that immediately surrounds the aperture 504.

The overall shape and size of the chew portion 530 and the projections 540 may be modified as the particular application requires. For example, the projections 540 may be formed to extend in between the teeth of a dog.

Figure 9:
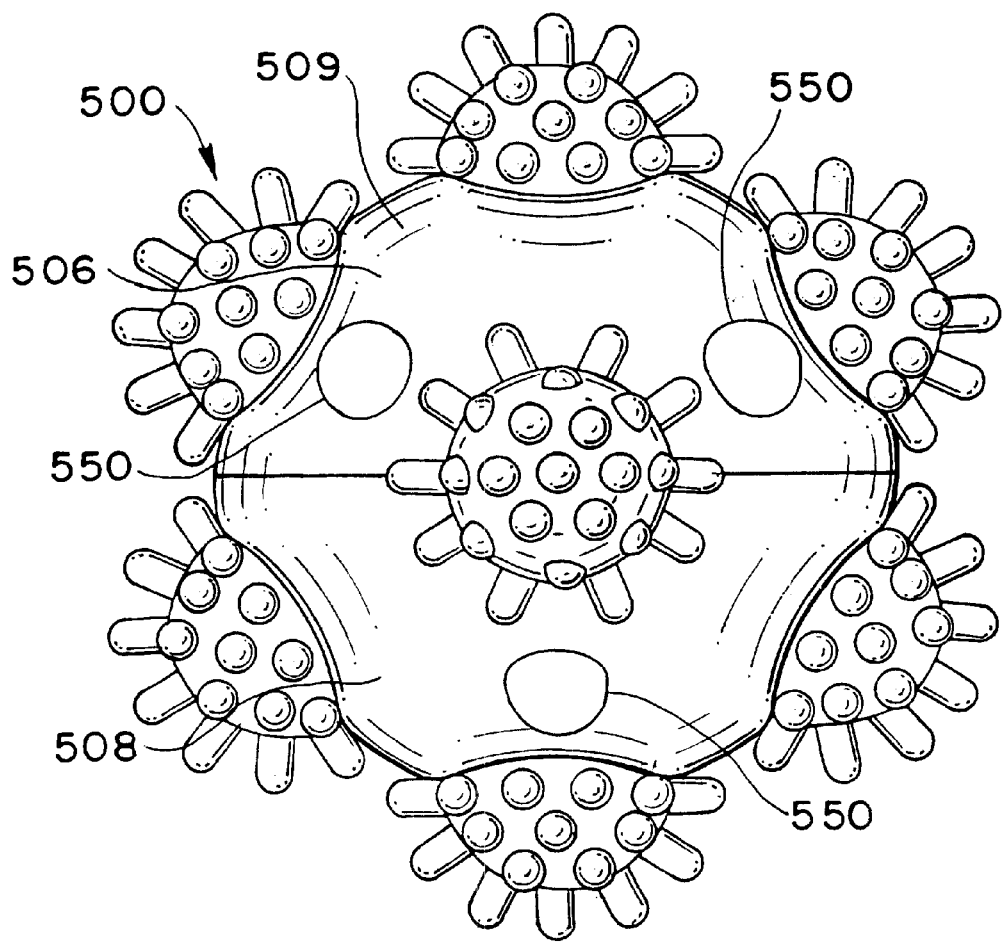
FIG. 9 is an elevational view of the chew toy of FIG. 5 having at least three hemispheres molded onto each half of the chew toy.

Referring now to FIG. 9, hemispheres 550 are shown being formed onto the surface 509 of the frame 502. In a preferred embodiment, at least one, and more preferably three hemispheres 550 are molded onto the surface 509 of the frame 502. Also, more than three hemispheres may be provided. The hemispheres 550 are meant to increase the overall chewing pleasure of the chew toy 500. The combination of the hemispheres 550 and the chew portions 530 are believed to better simulate the sensation of chewing meat on bone.

Furthermore, the spherical shape of the frame 502 allows the chew toy 500 to be used as a ball in games of fetch. Because the chew portions 530 add irregularity to the overall shape of the chew toy 500, the toy 500 will often bounce unpredictably. This unpredictability adds to the dog's enjoyment and exercise.

Figure 7A:
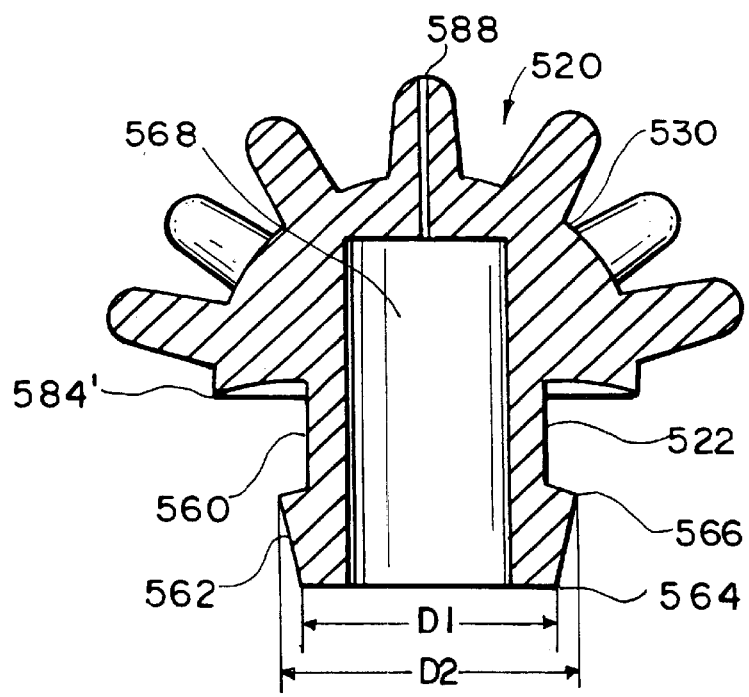
FIG. 7A is a cross-sectional view of a variation of the stud for use with the chew toy of FIG. 5.

In an alternative embodiment, shown in FIG. 10, frame 502 while being substantially spherical, has the plurality of flat portions 580, on the surface 509, encircling each of the apertures 504. On the frame 502, each aperture 504 is disposed such that it is centered in a respective flat portion 580. The flat portions 580 facilitate the retention of the studs 520 in a stable position with relatively little movement as the flat bottom 584 of the chew portion 530 of the stud 520 is abutted against the flat portion 580, when the stud 520 is inserted in the aperture 504, in substantially full face-to-face contact. Such contact reduces the possibility of the studs 520 rocking and eventually loosening. Flat portions 580 need not be truly flat, however, but may be slightly rounded, with a radius of curvature greater (i.e. less curved) than that of the frame 502 in general. With slightly rounded flat portions 580, or a truly spherical frame 502, the studs 520 as shown in FIG. 7 would not abut the slightly rounded flat portions 580 or the frame surface 509 in full face-to-face contact, but rather, would abut with limited area or point contacts. For this reason, if frame 502, in an alternative embodiment, is formed with slightly rounded flat portions 508, or to be truly spherical, without flat portions 580, the studs 520 should be formed with chew portions 530 having curved bottoms 584' with a curved shape, as shown in FIG. 7A, that preferably generally matches the shape of the surface 509, with or without slightly rounded flat portions 580, or other shapes (although not shown). The curved shape of the curved bottom 584' facilitates a stable abutment of the stud 520 against the curved, truly spherical frame 502, or frame with slightly curved flat portions 580. Also, each aperture 504, may have a chamfered edge 582, that also facilitates the insertion and stable retention of the studs.

As can also be seen in FIG. 10, aroma insert 586 may be disposed in the interior volume 570 by passing it through one of the apertures 504 prior to insertion of the studs 520. Alternatively, aroma insert 586 may be placed in one of the halves 506, 508 prior to sealing the halves 506, 508 together. Aroma insert 586 may be formed from a porous or spongy material, or any material known in the art that will retain an aroma. Prior to disposal in the frame 502, the aroma insert 586 is saturated with an aroma such as bacon or other aromas that are pleasing to pets, and dogs in particular. The aroma migrates from the interior volume 570 and enters the ambient atmosphere 572 and adds to the enjoyment of pets. The passage of the aroma from the interior volume 570 to the ambient environment 572 is facilitated by the frame 502 being made of a material, such as nylon, that facilitates passage of aromas through its structure. Also, the studs 520, may be formed with a small hole or channel 588 (see FIG. 7) to further facilitate the migration of the aroma into the ambient environment 572. Alternatively, scent and flavor additives can be compounded with the material for forming frame 502 or studs 520 before they are molded, as was discussed above with respect to frame 200 and soft portion 300.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A pet chew toy, comprising:
   a frame being formed of a first material having a first hardness; and
   a plurality of studs mounted on and supported by said frame, at least a portion of said studs having a second hardness substantially less hard than that of said first hardness.

2. The pet chew toy of claim 1, wherein:
   said frame having a male member and a female member;
   said male member having at least one protrusion;
   said female member having at least one groove; and
   said at least one protrusion being matingly engaged with said at least one groove such that said frame encompasses an interior volume.

3. The pet chew toy of claim 2, wherein:
   said male member and said female member are fused together.

4. The pet chew toy of claim 1 wherein:
   said frame defines an interior volume separated from an ambient atmosphere; and
   said frame comprises a plurality of apertures having a first diameter.

5. The pet chew toy of claim 4, wherein:
   said plurality of studs are disposed in said plurality of apertures such that a portion of each stud is disposed in said interior volume, and a portion of each stud is disposed in said ambient atmosphere.

6. The pet chew toy of claim 5, said plurality of studs comprising:
   a chew portion and a securing member, said securing member having;
   a stem, an anchor, and a hollow;
   said stem having a second diameter, said second diameter being less than or substantially equal to said first diameter; and
   said anchor having at least a portion with a third diameter, said third diameter being larger than said first diameter.

7. The pet chew toy of claim 5, said plurality of studs comprising:
   a chew portion and a securing member, said securing member having:
   a base comprising a pair of arms separated by a gap, and a stem;
   said stem having a fourth diameter, said fourth diameter being less than or substantially equal to said first diameter; and
   said base having at least a portion with a fifth diameter, said fifth diameter being larger than said first diameter.

8. The pet chew toy of claim 1, wherein said frame further comprises:
   an outer surface; and
   a plurality of hemispheres disposed on said outer surface.

9. The pet chew toy of claim 4, further comprising:
   an aroma insert disposed in said interior volume.

10. The pet chew toy of claim 1 wherein:
    said frame defines an interior volume separated from an ambient atmosphere; and
    an aroma insert being disposed in said interior volume.

11. The pet chew toy of claim 10, wherein:
    at least one of said plurality of studs comprises a hole to facilitate migration of an aroma from said aroma insert to said ambient atmosphere.

12. The pet chew toy of claim 1 wherein:
    said plurality of studs include an aroma producing material.

13. The pet chew toy of claim 5, further comprising:
    a plurality of flat portions formed on said frame, said plurality of flat portions encircling said plurality of apertures, said flat portions facilitating stable retention of said plurality of studs in said plurality of apertures.

14. The pet chew toy of claim 13, wherein:
    said plurality of studs each having a portion thereof in substantially full face-to-face contact with respective one of said plurality of flat portions.

15. The pet chew toy of claim 1, wherein:
    said plurality of studs each having a portion thereof in substantially full face-to-face contact with a portion of said frame.

16. A pet chew toy, comprising:
    a frame being formed of a first material having a first hardness;
    a chew portion mounted on and supported by the frame, at least a portion of said chew portion having a second hardness substantially less hard than that of said first hardness;
    said frame defining an interior volume; and
    an aroma insert disposed in said interior volume.

17. The pet chew toy of claim 16, wherein:
    said frame further comprising a hole communicating said interior volume with an ambient atmosphere, said hole facilitating migration of an aroma from said aroma insert to said ambient atmosphere.

* * * * *